United States Patent [19]

Kervagoret

[11] Patent Number: 4,641,497
[45] Date of Patent: Feb. 10, 1987

[54] DEVICE FOR GENERATING BRAKING PRESSURE FOR A BRAKING INSTALLATION WITH TWIN CIRCUITS

[75] Inventor: Gilbert Kervagoret, Argenteuil, France

[73] Assignee: Societe Anonyme D.B.A., Paris, France

[21] Appl. No.: 701,906

[22] Filed: Feb. 15, 1985

[30] Foreign Application Priority Data

Feb. 22, 1984 [FR] France ............... 84 02654

[51] Int. Cl.[4] ............... B60T 13/58; B60T 17/00; F15B 7/00
[52] U.S. Cl. .................. 60/563; 60/565; 60/591
[58] Field of Search ............ 60/547.1, 547.3, 551, 60/560, 562, 563, 564, 566, 565, 591

[56] References Cited

U.S. PATENT DOCUMENTS

| 2,410,269 | 10/1946 | Chouings | 91/372 |
|---|---|---|---|
| 3,719,044 | 3/1973 | Bach | 60/547.3 X |
| 3,877,227 | 4/1975 | Demido | 60/552 X |
| 3,907,375 | 9/1975 | Lewis et al. | 60/547.3 X |
| 4,196,592 | 4/1980 | Nomura et al. | 60/547.1 |
| 4,462,300 | 7/1984 | Belart | 60/547.1 X |
| 4,534,171 | 8/1985 | Leiber | 60/562 X |

FOREIGN PATENT DOCUMENTS 2332445 4/1978 France .
2457202 12/1980 France .

Primary Examiner—Robert E. Garrett
Assistant Examiner—George Kapsalas
Attorney, Agent, or Firm—Larry J. Palguta; Ken C. Decker

[57] ABSTRACT

The device incorporates an actuating piston (6) in tandem with a master cylinder piston (7) both defining first (8) and second (9) braking pressure chambers. A valve mechanism (34), in line with the control valve mechanism (12) of the device, is controlled by a mode selector piston (31) exposed to the actuating pressure coming from the source of fluid under pressure (25) so as normally to isolate the first chamber (8) of the braking circuit (I) joined to the working chamber (5). In the case of failure of the pressure source, the braking circuit (I) is joined to the primary chamber (8).

9 Claims, 2 Drawing Figures

DEVICE FOR GENERATING BRAKING PRESSURE FOR A BRAKING INSTALLATION WITH TWIN CIRCUITS

BACKGROUND OF THE INVENTION

1. Field of the Invention

The present invention concerns devices for generating braking pressure for a braking installation incorporating at least two braking circuits, particularly for a motor vehicle, incorporating a casing enclosing a working chamber intended to be joined to a first braking circuit, a sliding actuating piston having a first end exposed to the working chamber and defining, by its other end, a braking pressure chamber intended to be joined to a braking circuit, a control valve means for admitting selectively a fluid under pressure coming from a source of fluid under pressure into the working chamber, and an actuating plunger intended to be joined to a brake pedal, protecting into the working chamber and able to be coupled mechanically with the first end of the actuating piston and with the valve means.

2. Description of the Prior Art

A device of this type is described, for example, in the documents U.S. Pat. No. 2,410,269 and FR-A-2,332,445. In this type of brake servomotor, the pressure modulated by the valve means and admitted into the working chamber is transmitted directly to the first braking circuit in a hydrodynamic mode, more commonly known by the Anglo-Saxon term "full power" mode, this same modulated pressure acting on the actuating piston so as to create, this time in a hydrostatic mode, in the braking pressure chamber, an amplified pressure which is transmitted to the second braking circuit. These devices therefore operate in a mixed mode, differently for each braking circuit. However, in the case of failure of the pressure source, or of the the associated supply circuit, only the second braking circuit remains operative, by operating "manually" under the effect of the muscular force exerted by the driver. Devices with purely hydrodynamic operation also exist for the two braking circuits, as described for example in the document FR-A-2,457,202. In the latter case, failure of the pressure source renders the braking installation completely inoperative.

SUMMARY OF THE INVENTION

The aim of the present invention is to propose a novel device for generating pressure of the type first mentioned, having a simple and compact construction, low cost of manufacture, reliable operation, and having high sensitivity and reduced hysteresis phenomena, and able to ensure the operation, possibly repeated and prolonged, of the two braking circuits in "manual" operation in the case of failure of the pressure source.

To achieve this, according to a characteristic of the invention, the device for generating braking pressure incorporates: a master cylinder piston exposed on one side to the pressure existing in the (first) braking pressure chamber and defining, on the other side, a second braking pressure chamber intended to be joined to the second braking circuit; a high pressure chamber intended to be joined to the source of fluid under pressure and communicating with the control valve means and with one end of a bore in which is mounted so as to slide and to be sealed a mode selector piston coupled to a valve means with three ways and two positions elastically pushed in the direction towards the mode selector piston and capable of putting an output orifice joined to the first braking circuit into communication either with the working chamber or with the first braking pressure chamber, the braking pressure chambers communicating, in the rest position of the device, with at least one reservoir.

With such an arrangement, the mixed mode is retained in normal operation, between the two braking circuits, the second braking circuit being joined to the second braking pressure chamber which, however, is not directly pressurized by the actuating piston, but indirectly by the intermediary of the fluid trapped in the first braking pressure chamber which is kept isolated from the first braking circuit, supplied hydrodynamically. However, in the case of failure of the pressure source, the first braking circuit then becomes isolated from the working chamber but becomes joined to the first braking pressure chamber, the device then behaving like a conventional non-assisted tandem master cylinder, thus ensuring effective braking in both braking circuits.

Other characteristics and advantages wof the present invention will emerge from the following description of an embodiment, given by way of illustration but not limiting in any way, with reference to the accompanying drawings, in which:

DESCRIPTION OF THE PREFERRED EMBODIMENT

Figure 1:
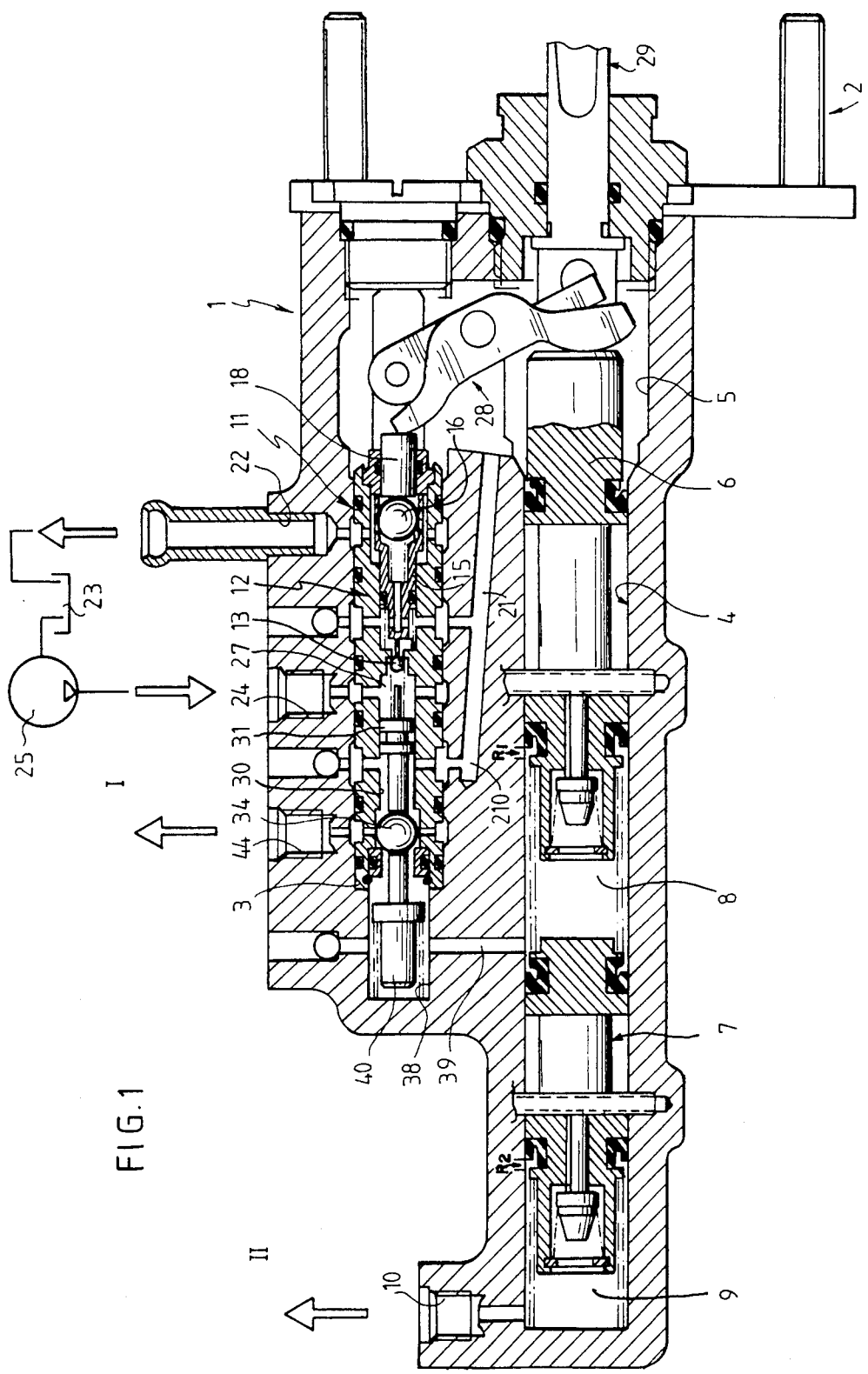
FIG. 1 is a view in longitudinal section of a device for generating braking pressure according to the invention.

In the embodiment shown in the drawing, the device according to the invention incorporates essentially a casing 1 incorporating means for fixing 2 to the chassis of a motor vehicle, in which are formed, in a general arrangement similar to that described in the document FR-A-2,332,455 mentioned above, whose contents are assumed to be attached herewith for reference, two parallel tubular spaces 3 and 4 opening into a working chamber 5 formed at one end of the casing 1 and closed by a cover. Mounted in tandem in the tubular space 4, so as to slide and to be sealed, are an actuating piston 6 whose rear end projects into the working chamber 5, and a master cylinder piston 7. The master cylinder piston 7 defines with the opposite end of the actuating piston 6 from the working chamber 5 a first braking pressure chamber 8, and with the opposite end of the tubular space 4 from the working chamber 5, a second braking pressure chamber 9 opening to the outside of the body through an orifice 10 intended for connection to a braking circuit II.

A tubular liner 11 is situated in the tubular space 3, internally shaped with stepped passages which are coaxial and intercommunicating in which are situated the components constituting a control valve means, given the general reference 12, incorporating essentially a high pressure valve in which the ball 13 is elastically pushed against a seat 14 formed in a transverse wall of the liner 11 and capable of being lifted by the end of a sleeve 15 sliding inside the liner 11 and enclosing an isolating valve in which the ball 16 is normally held separated from its seat 17 formed in the sleeve 15 but may be displaced by a plunger component 18 sliding so as to be sealed in a cover 19 for closing the liner 11. The liner is shaped externally with an annular peripheral groove 20 communicating internally with the housing carrying, so as to slide, the sleeve 15 and externally with a passage 21 formed in the casing 1 between the spaces 3 and 4 and communicating with the working chamber 5. An orifice 22, intended to be joined to a reservoir 23, is formed in the wall of the casing 1 and communicates with the space 3 in the region of the isolating ball valve 16. An orifice 24, intended to be joined to a source of fluid under pressure 25, is also formed in the wall of the casing 1 and communicates with an annular peripheral groove 26 of the liner 11 communicating internally with a high pressure chamber 27 to which the housing of the ball 13 of the high pressure valve is connected. The general arrangement of the control valve means just described is similar to that described in the document FR-A-2,332,445 mentioned above. As in the latter document, a mechanism with a double lever 28 is situated in the working chamber 5 to co-operate selectively with the actuating piston 6 and the plunger component 18 of the control valve means 12. The lever mechanism 28 is itself actuated by an actuating plunger 29 sliding so as to be sealed in the cover of the working chamber 5 and intended to be joined to a brake pedal of the motor vehicle (not shown).

According to a feature of the invention, the high pressure chamber 27 is formed by the rear end of a bore 30 in the liner 11 in which a mode selector piston 31 is mounted so as to slide and to be sealed, against which the spring 32 bears, pushing the ball 13 of the high pressure valve against its seat 14. The mode selector piston 31 is extended on the opposite side from the ball 13 by a rod 33 co-operating with the ball of a valve 34 situated in an intermediate enlargement 35 of the bore 30 defining with the latter two annular seats facing one another 36 and 37, respectively. The bore 30 opens, at its opposite end from the high pressure chamber 27, into an end chamber 38, formed by the end of the tubular housing 3 and communicating, through a passage 39 formed in the casing 1, with the first pressure chamber 8 between the pistons 6 and 7. A plunger component 40 is situated in the chamber 38, incorporating an end rod 41 co-operating in abutment with the ball 34 under the effect of the pressure of a spring 42 bearing against the bottom of the end chamber 38. The intermediate enlargement 35 of the bore 30 communicates with an annular peripheral groove 43 in the liner 11, itself communicating with an orifice 44 formed in the wall of the body 1 and intended to be joined to a braking circuit I. The portion of the bore 30 situated between the ball seat 36 and the mode selector piston 31 communicates externally with an annular peripheral groove 45 in the liner 11, itself communicating with an extension 210 of the passage 21 opening into the working chamber 5.

In normal operation, a pressure exerted on the actuating plunger 29 is transmitted to the plunger component 18 which places the isolating ball 16 against its seat 17 then moves the sleeve 15 relative to the liner 11 so as to lift the ball 13 from its seat 14 and admit the fluid under pressure from the high pressure chamber 27 into the working chamber 5 through the groove 20 and the passage 21, thus moving the actuating piston 6 towards the left (as shown in the drawings) while compressing the fluid in the first braking pressure chamber 8 and transmitting this pressure to the master cylinder piston 7 to create a braking pressure in the braking circuit II, the modulated assistance pressure in the working chamber 5 being communicated to the braking circuit I through the passages 21, 210, the central portion of the bore 30, the intermediate enlargement 35 of the latter, the groove 43 and the orifice 44. In fact, under these conditions of normal operation, the pressure of the source of fluid under pressure in the high pressure chamber 27 pushes the mode selector piston 31 towards the left, as shown in the drawings, against the ball 34, thus placing the latter against its seat 37 against the force of the spring 42, thus isolating the first braking pressure chamber 8 from the orifice 44 but keeping the latter in permanent communication with the passages 21, 210, the modulated assistance pressure in the working chamber 5 being lower than the pressure of the pressure source and therefore preventing the ball 34/mode selector piston 31 combination from moving towards the right despite the pressure of the spring 42. As mentioned initially, the first braking pressure chamber 8 does not therefore communicate normally with the braking circuit I but serves to create, through the intermediary of the master cylinder piston 7, the braking pressure in the second braking pressure chamber 9 for the braking circuit II.

Figure 2:
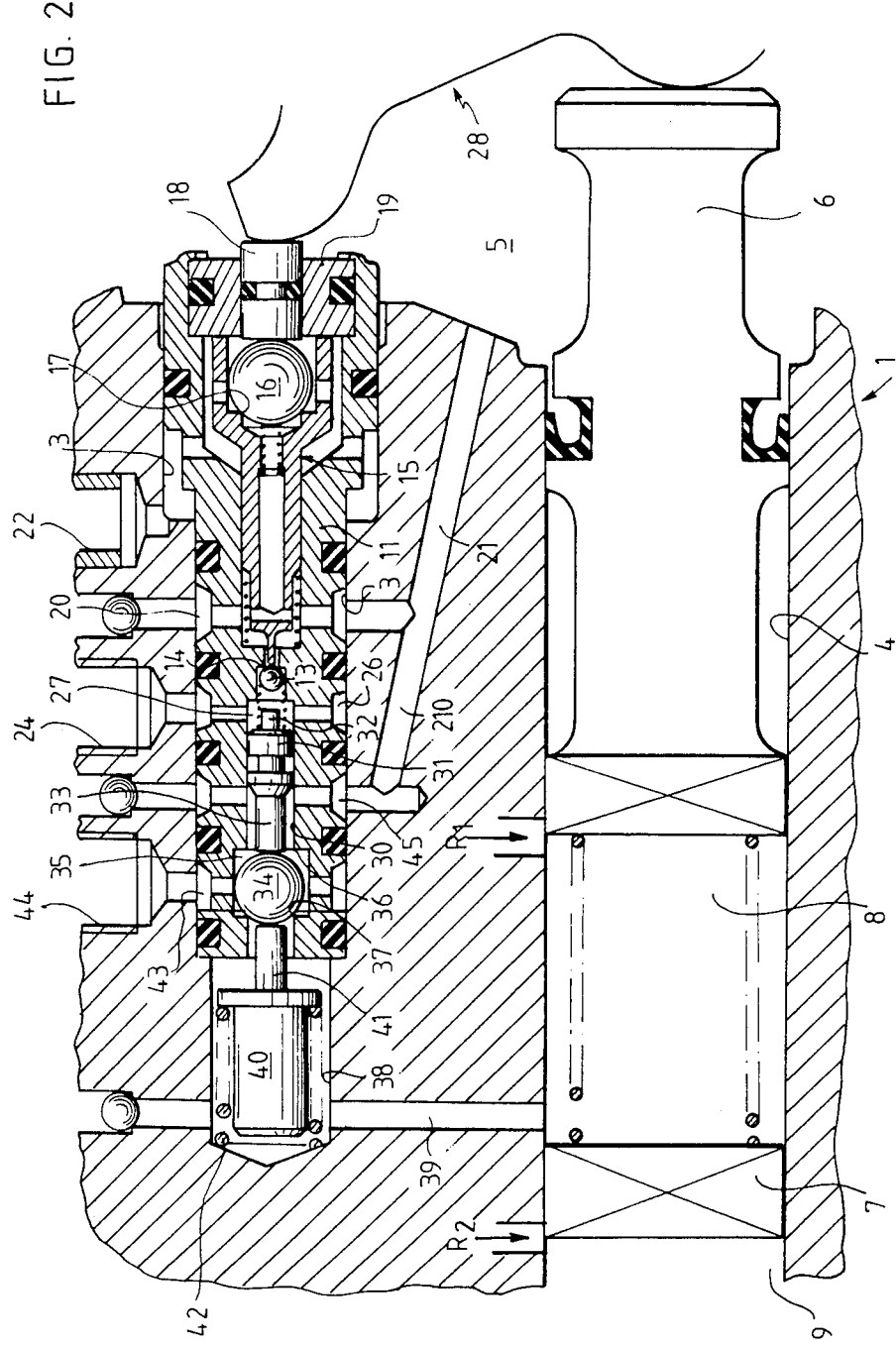
FIG. 2 is a partial enlarged view in longitudinal section of the device shown in FIG. 1, with the actuating piston and master cylinder piston illustrated schematically.

However, in the case of failure of the source of fluid under pressure 25, the mode selector piston 31 no longer exerts any appreciable force against the ball 34 which, owing to this fact, switches from its configuration in which it bears against its seat 37 to one in which it bears against the other seat 36 under the effect of the force of the spring 42. In this new configuration, communication is thus interrupted between the orifice 44 (and hence the braking circuit I) and the passages 21, 210, the orifice 44, however, then being put into communication with the first braking pressure chamber 8 via the chamber 38 and the passage 39. Under these conditions, as mentioned above, the pistons 6 and 7, actuated "manually" directly by the actuating plunger 29 act as the primary and secondary pistons of a conventional non-assisted tandem master cylinder. In order to allow prolonged use in this latter configuration, the braking pressure chambers 8 and 9 communicate normally, in the configuration of the device at rest, with associated reservoirs R1 and R2 as shown in FIG. 2.

Although the present invention has been described relative to particular embodiments, it is not limited by them, but on the contrary is capable of modifications and variants which will be apparent to a person versed in the art.

I claim:

1. A device for generating braking pressure for a braking installation including at least two braking circuits, particularly for a motor vehicle, including a casing enclosing a working chamber intended to be joined to a first braking circuit, a sliding actuating piston having a first end exposed to the working chamber and defining, at a second end, a first braking pressure chamber intended to be joined to a braking circuit, control valve means for admitting selectively into the working chamber fluid pressure from a source of fluid pressure, and an actuating plunger intended to be joined to a brake pedal and projecting into the working chamber to be coupled mechanically with the first end of the actuating piston and with the control valve means, characterized in that the device includes a master cylinder piston exposed on one side to pressure existing in the first braking pressure chamber and defining on the other side a second braking pressure chamber intended to be joined to a second braking circuit, a high pressure chamber intended to be joined permanently to the source of fluid pressure and communicating with the control valve means and with one end of a bore in which is mounted slidably and sealingly a mode selector piston coupled to three-way valve means, the three-way valve means pushed elastically in a direction toward the mode selector piston and capable of putting an output orifice of the casing, intended to be joined to the first braking circuit, into communication with one of the working chamber and first braking pressure chamber, the braking pressure chambers communicating, in a rest position of the device, with at least one reservoir, the three-way valve means comprising a ball situated in an intermediate enlargement of the bore and defining with the bore two annular seats facing one another and communicating with the output orifice.

2. The device according to claim 1, characterized in that a portion of the bore housing the mode selector piston is in permanent communication, on a side of the piston opposite the high pressure chamber, with the working chamber.

3. The device according to claim 2, characterized in that the actuating piston and master cylinder piston are situated in-line in a first tubular space of the casing and essentially coaxial with the actuating plunger.

4. The device according to claim 3, characterized in that the control valve means is arranged in a second tubular space of the casing and parallel to the first tubular space, the tubular spaces opening into the working chamber, the control valve means and actuating piston coupled to the actuating plunger by a lever mechanism housed in the working chamber.

5. The device according to claim 4, characterized in that the mode selector piston and three-way valve means are situated in-line with the control valve means in the second tubular space.

6. The device according to claim 5, characterized in that the control valve means, the mode selector piston and the three-way valve means are situated in a liner mounted in the second tubular space.

7. The device according to claim 6, characterized in that the control valve means includes a high pressure ball valve, and an isolating ball valve mounted in a movable sleeve, the isolating ball valve controlling the high pressure ball valve.

8. The device according to claim 7, characterized in that the high pressure ball valve is pushed toward a closed position by a spring bearing against the mode selector piston.

9. The device according to claim 8, characterized in that the ball of the three-way valve means is pushed in abutment against the mode selector piston by a plunger component situated in an end of the second tubular space opposite the working chamber.

* * * * *